(12) United States Patent
Yang

(10) Patent No.: US 7,017,697 B2
(45) Date of Patent: Mar. 28, 2006

(54) ENGINE DRIVEN MOTORCYCLE POWER REVERSE SYSTEM

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 0 days.

(21) Appl. No.: 10/395,103

(22) Filed: Mar. 25, 2003

(65) Prior Publication Data

US 2004/0188163 A1    Sep. 30, 2004

(51) Int. Cl.
*B62K 11/00* (2006.01)
(52) U.S. Cl. .................................................. 180/230
(58) Field of Classification Search ............... 180/230, 180/65.2, 69.6, 219, 220
See application file for complete search history.

(56) References Cited

U.S. PATENT DOCUMENTS

| | | | | |
|---|---|---|---|---|
| 1,992,210 A | * | 2/1935 | Higley | 475/152 |
| 3,211,249 A | * | 10/1965 | Papst | 180/65.2 |
| 3,923,115 A | * | 12/1975 | Helling | 180/65.2 |
| 4,763,538 A | * | 8/1988 | Fujita et al. | 74/6 |
| 4,869,332 A | * | 9/1989 | Fujita et al. | 180/65.2 |
| 4,923,028 A | * | 5/1990 | Yamashita et al. | 180/219 |
| 5,549,524 A | * | 8/1996 | Yang | 477/3 |
| 5,644,200 A | * | 7/1997 | Yang | 318/139 |
| 5,730,243 A | * | 3/1998 | Koike et al. | 180/220 |

\* cited by examiner

*Primary Examiner*—Lesley D. Morris
*Assistant Examiner*—Paul Royal, Jr.
(74) *Attorney, Agent, or Firm*—Rabin & Berdo, P.C.

(57) ABSTRACT

A power reverse system for an engine driven motorcycle with two or more than two wheels permits the motorcycle to execute power reverse.

4 Claims, 6 Drawing Sheets

ENGINE DRIVEN MOTORCYCLE POWER REVERSE SYSTEM

BACKGROUND OF THE INVENTION (a) Field of the Invention

The present invention is related to a power reverse system for an engine driven motorcycle, and more particularly, to one that provides a power reverse function for any motorcycle with two or more than two wheels.

(b) Description of the Prior Art

If an automatic transmission belt (CVT) is used as a transmission for a conventional engine-driven motorcycle, there is usually no reverse provided. It's not surprising to see packs of motorcycle squeezed in limited parking area on both sides of the road. The rider has to first pull his motorcycle out of the pack, ride on it and use both feet to hold against the ground to reverse his motorcycle. It requires some efforts, particularly for a female rider since the road has its center lane higher than both side lanes, actually one has to use his feet to push against the ground uphill just to get his motorcycle out of the parking area. The power reverse system for an engine driven motorcycle of the present invention presents the solution.

SUMMARY OF THE INVENTION

The primary purpose of the present invention is to provide a power reverse system for an engine driven motorcycle with two or more than two wheels for the motorcycle to further execute power reverse.

DETAILED DESCRIPTION OF THE PREFERRED EMBODIMENTS

A power reverse system for an engine-driven motorcycle is essentially comprised of a specific driveline coupled between a motor and the engine in the engine driven motorcycle, and characterized in that the specific driveline coupled to the motor and the engine provides two different functions depending on the driving direction of the motor. They are (1) to start the engine when the motor is rotating in a positive direction, and to draw back from the transmission related to the engine after the engine is started; and (2) to cause the specific driveline of the engine driven motorcycle, a reduction gear and a wheel set to execute a reverse drive operation when the motor is rotating in negative direction; or a standalone reverse drive motor is provided exclusively for the power reverse drive of the engine-driven motorcycle. The motor may be replaced with a dynamo-electric unit that functions as a motor and a generator to regenerate and charge the batteries via a feedback control circuit when the motorcycle is applying a brake, or to supply power to another electric load to apply the brake. All these functions disclosed herein relate to the primary innovation objectives and preferred embodiments of the power reverse system for the engine driven motorcycle of the present invention.

Figure 1:
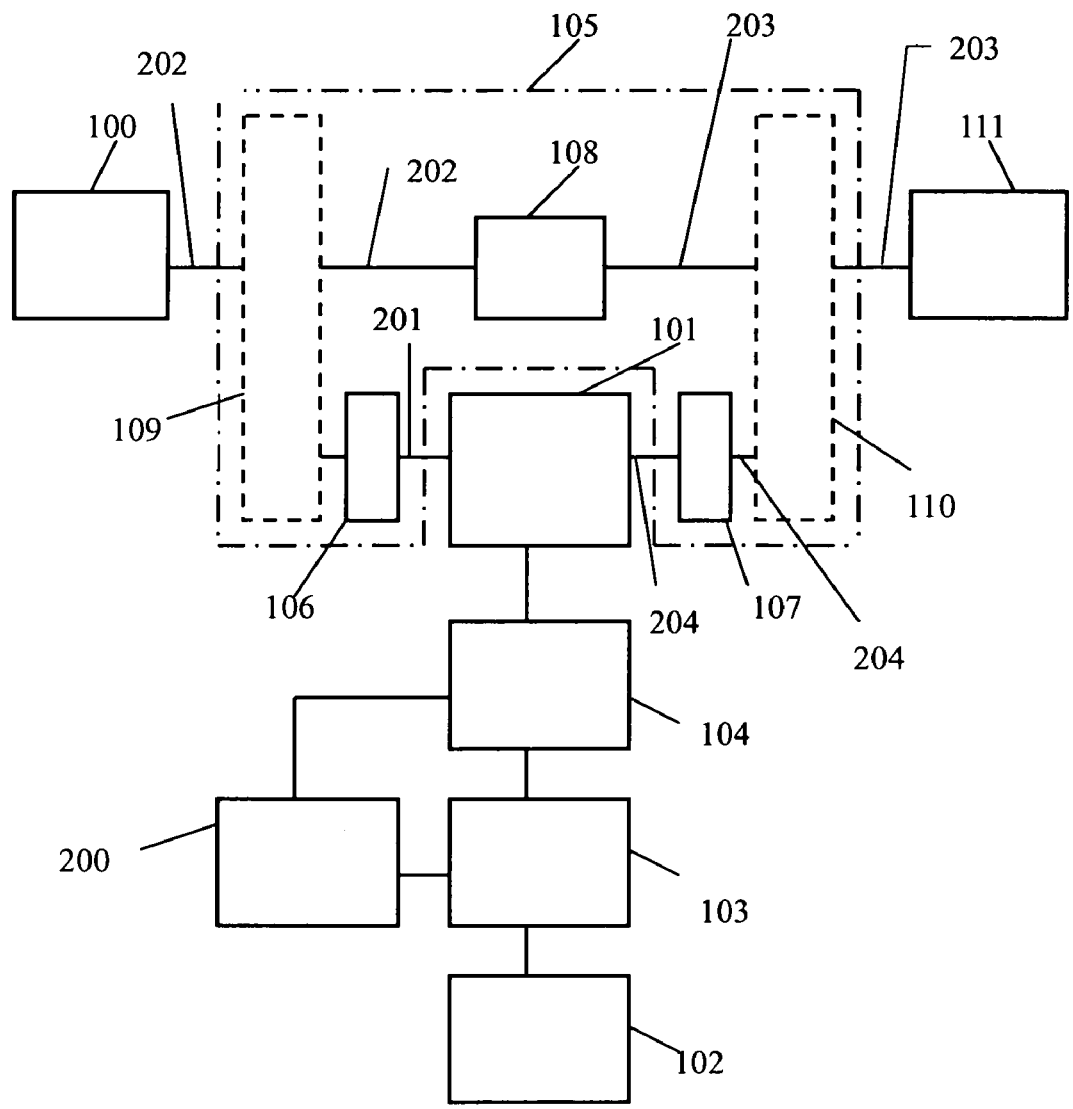
FIG. 1 is a first system block chart of the structure of the present invention.

FIG. 1 shows that a first system block chart of the structure of the power reverse system for the engine driven motorcycle of the present invention is essentially comprised of:

an engine 100: relates to an internal combustion engine driven by gasoline, diesel, alcohol, gas or other types of fuel to drive a load;

a motor unit 101: comprised of an AC or DC brush or brushless rotary motor subject to manual control interface 102, to start the engine when rotating in a positive direction; and to drive the engine driven motorcycle to execute power reverse when rotating in a negative direction;

the manual control interface 102: comprised of a dynamo-electric or solid-state device to manually transmit system operation commands to a central controller;

a central controller 103: relates to a control circuit comprised of a microprocessor, a solid-state device, or a dynamo-electric device, to process feedback signals and commands sent from the manual control interface, and transmit control signals to a drive control device;

a drive control device 104: comprised of dynamo-electric or solid-state device to receive signals from the central controller to control the motor to operate, and control the rotating direction of the motor, or the rpm of the motor if required;

a battery set 200: relates to conventional batteries to start and to supply power to other loads, or may be replaced by a super capacitor;

a specific driveline 105: including a one-way driver 106 (or a conventional clutch mechanism that automatically drops back once the engine is started) provided to change the operation relationship among the power units in the system, wherein, a turning axle 201 of the motor unit 101 is provided for a turning axle 202 of the motor unit 101 to start the engine 100 via a primary transmission ratio device 109 when the motor unit 101 is rotating in positive direction; and another one-way driver 107 is provided for a turning axle 201 of the motor unit 101 to drive a turning axle 204 of the motor unit 101 to start another turning axle 203 thus to drive a load 111, via a secondary transmission ratio device 110 when the motor unit 101 is rotating in a positive direction depending on the rotating direction of the motor unit 101; and an eccentric clutch 108 is provided to have both of its ends respectively incorporated to the turning axle 202 and another turning axle 203, so that a rotating drive structure drawn by the turning axle 203 closer to the engine 100 closes up once the revolution of the rotating drive structure attains its rated rpm for both ends of the eccentric clutch 108 to drive, and cuts off the drive between both ends of the eccentric clutch 108 when the rotating drive structure falls under the rated rpm; the primary transmission ratio device 109 driving between the motor and the engine, and the secondary transmission ratio device 110 driving between the motor and the load are each comprised of gear set, chain and sprocket, belt gear and belt pulley or other transmission device with variable ration or rotating direction; and a load 111: relates to an engine driven motorcycle with two or more than two engine powered wheels.

When the power reverse system for the engine driven motorcycle comprised of those structural units and the specific driveline 105 described above operates, the motor unit 101 is subject to the control by the drive controller 104 so as to start the engine 100 when the motor unit 101 is rotating in positive direction; and to drive the engine driven motorcycle to execute power reverse drive when the motor unit 101 is rotating in negative direction; wherein, (1) when the motor unit 101 is rotating in the positive direction, its turning axle 201 drives another turning axle 202 to start the engine 100 via the one-way driver 106 (or a conventional clutch mechanism that automatically draws back once the engine is started), and the primary transmission ratio device 109, and the running engine 100 accelerates to such extent that the eccentric clutch 108 closes up, for the engine power to drive the load 111 through the turning axle 202, the eccentric clutch 108 and another turning axle 203 while the motor unit 101 is turned to stand-by status; and (2) when the motor unit 101 is rotating in negative direction, the rotating direction of the load 111 is opposite to the driving direction of the engine 100 due to the conversion made by the specific driveline 105, for the turning axle 201 of the motor unit 101 to drive another turning axle 203 via another one-way driver 107 and the secondary transmission ratio device 110, thus to drive the load 111 to execute power reverse, meanwhile, the engine 110 may be idled or running at an rpm slower than that required to close up the eccentric clutch 108, and further to make the eccentric clutch 108 to stay in its interrupted status.

Figure 2:
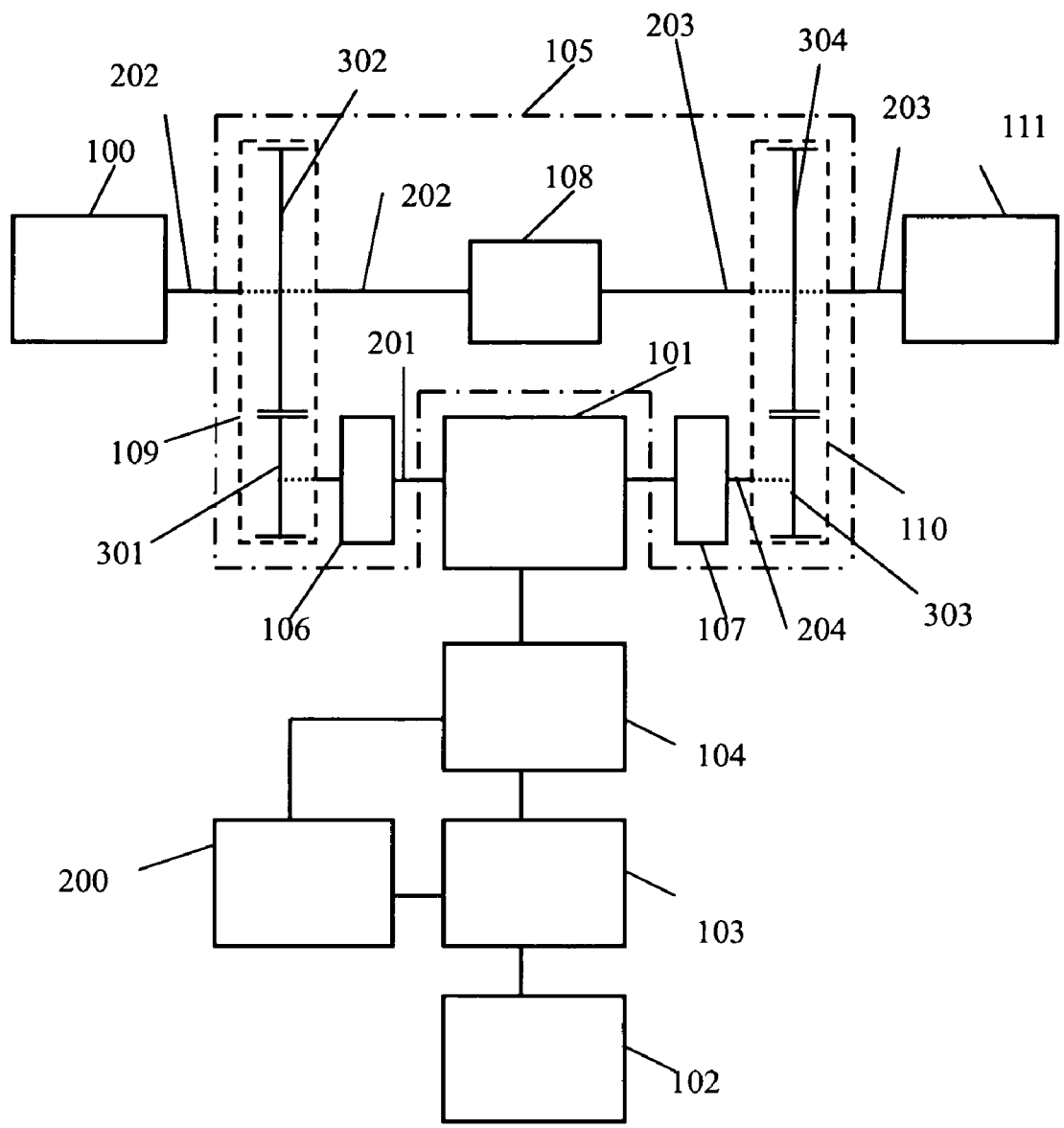
FIG. 2 is a second system block chart of the structure of the present invention.

FIG. 2 shows that a second system block chart of the structure of the power reverse system for the engine driven motorcycle of the present invention is essentially comprised of:

an engine 100: relates to an internal combustion engine driven by gasoline, diesel, alcohol, gas or other types of fuel to drive a load;

a motor unit 101: comprised of an AC or DC brush or brushless rotary motor subject to manual control interface 102, to start the engine 100, wherein, kinetics of the turning axle is transmitted to the turning axle 202 to start the engine 100 through the power coupling by the one-way driver 106 (or the conventional clutch mechanism that draws back one the engine is started) provided in the specific driveline 105 when the motor unit 101 is rotating in positive direction; and to drive the engine driven motorcycle to execute power reverse when rotating in negative direction while another one-way driver 107 keeps it idling between the turning axle of the motor unit 101 and the turning axle 203 of the load 111; once the running engine unit 101 is accelerating to an rpm higher than that of the turning axle 201, the one-way driver 106 (or the conventional clutch mechanism that draws back one the engine is started) either idles or draws back while the eccentric clutch 108 used to drive the load side closes up once the running engine 100 accelerates up to a preset rpm for the engine 100 to drive the load; when the turning axle 201 of the motor unit 101 is rotating in negative direction, kinetics generated by the rotation of the motor unit 101 drives the turning axle 203 of the load via another one-way driver 107 and the specific driveline 105 for the motorcycle to execute reverse;

gears 301, 302 (or other driver): related to the primary transmission ratio driver 109 comprised of optional gears 301, 302 device to the turning axle 201 of the electro-mechanical unit and the turning axle 202 of the engine 100;

gears 303, 304 (or other driver): related to the second transmission ratio driver 110 comprised of optional gears 301, 302 device to the turning axle 203 of the load and the turning axle 204 of the motor unit 101;

the eccentric clutch 108 having both turning axles at its both ends respectively incorporated to the turning axle 202 of the engine 100 and the turning axle 203 of the load; and its active side that controls the friction plate depending on the rpm is incorporated to the turning axle 202 of the engine 100, and its passive side, to the turning axle 203 of the load;

the turning axle 201 of the motor and the turning axle 203 of the load being engaged to a gear 304 by means of a pinion to execute operation in opposite direction;

a manual control interface 102: comprised of a dynamo-electric or solid-state device to manually transmit system operation command to a central controller 103;

a central controller 103: relates to a control circuit comprised of a microprocessor, a solid-state device, or a dynamo-electric device, to process feedback signals and commands sent from the manual control interface, and transmit control signals to a drive control device;

a drive control device 104: comprised of dynamo-electric or solid-state device to receive signals from the central controller to control the motor to operate, and control the rotating direction of the motor, or the rpm of the motor if required;

a load 111: relates to an engine driven motorcycle with two or more than two engine powered wheels, including the transmission, driver and wheels; and a battery set 200: relates to conventional batteries to start and to supply power to other loads, or may be replaced by a super capacitor.

Figure 3:
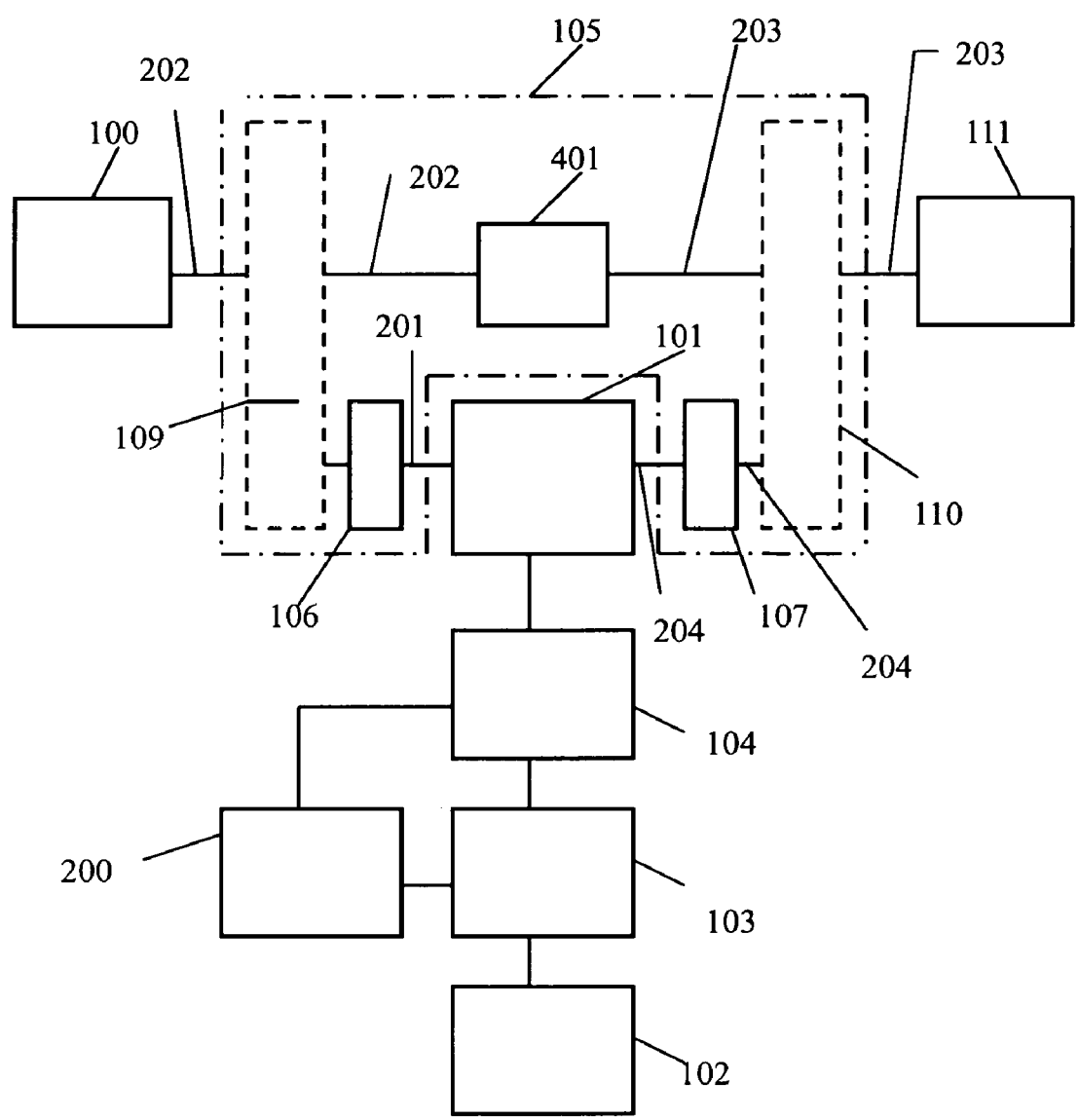
FIG. 3 is a third system block chart of the structure of the present invention.

FIG. 3 shows a third system block chart of the structure of the power reverse system for the engine driven motorcycle of the present invention; wherein, the eccentric clutch 108 as illustrated in FIG. 1 is replaced by a clutch 401, which is driven by mechanical force, fluid or electromagnetic force controlled manually, and the running engine will not interfere with the control of the motor unit 101 to execute reverse since the clutch 401 is manually operated to indicate open circuit status.

Figure 4:
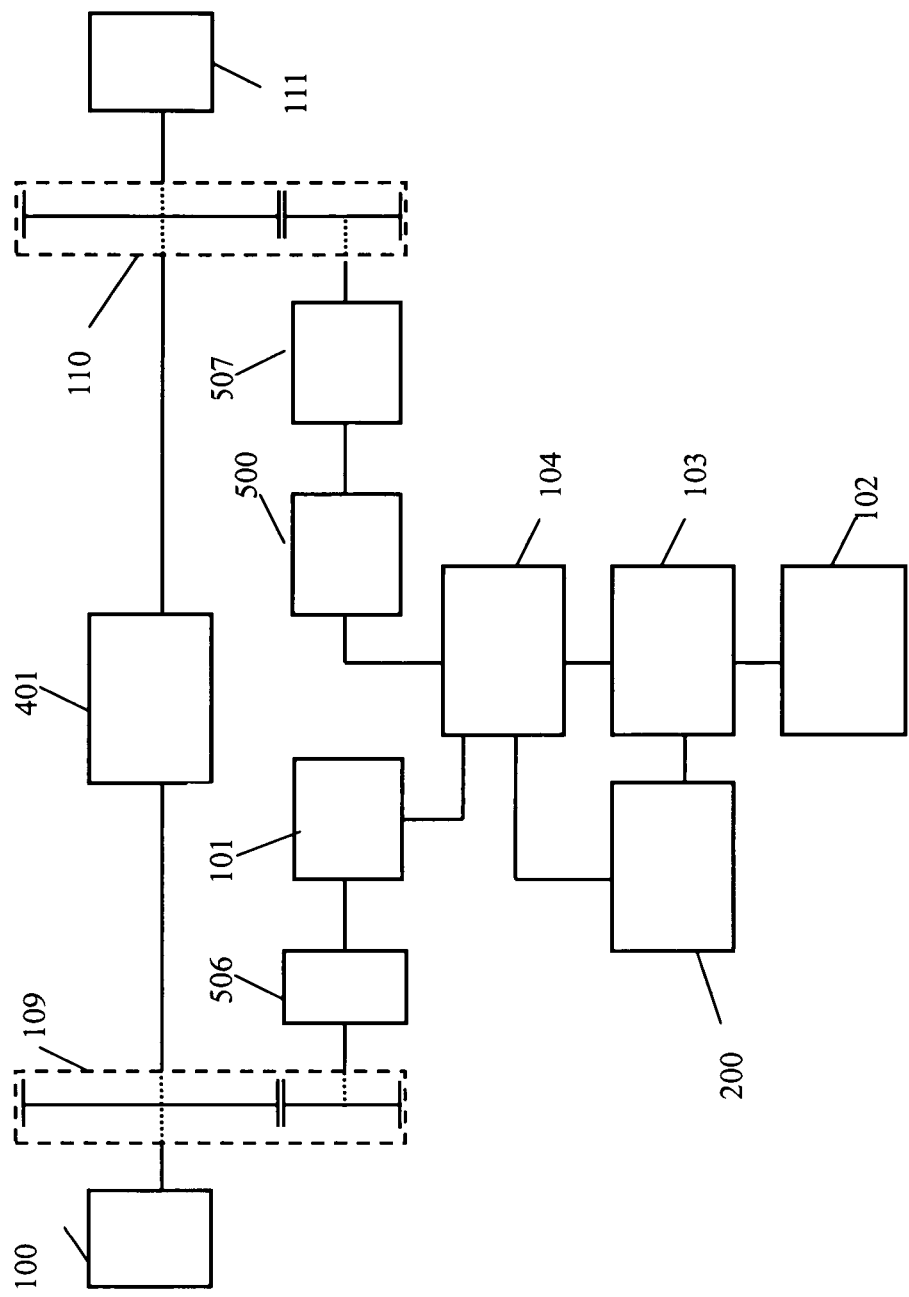
FIG. 4 is a fourth system block chart of the structure of the present invention.

As illustrated in FIG. 4 for a fourth system block chart of the structure of the power reverse system for the engine driven motorcycle of the present invention, wherein, the motor unit 101 starts the engine via a one-way driver 506 (or a conventional clutch mechanism that automatically draws back once the engine is started) and the primary transmission ratio driver 109. A reverse specific motor 500 is further provided to drive the load 111 via another one-way driver 507 and the secondary transmission ratio driver 110. Wherein, both of the control interface 102 and the drive controller 104 control the reverse specific motor 500 to execute power reverse drive for the engine driven motorcycle, i.e., the load 111. A manually controllable clutch 401 driven by manually controlled mechanical, fluid, or electromagnetic force provided at where between the engine 100 and the load 111, closes up while the engine 100 is running so to allow the motorcycle to execute forwarding drive and the reverse specific motor 500 is idling; or as required, an optional idling gear is provided in the local transmission, or the manually controllable clutch 401 is interrupted in the course of executing the power reverse so to prevent mutual interference with each other between the power reverse function and the forwarding drive by the engine 100.

Figure 5:
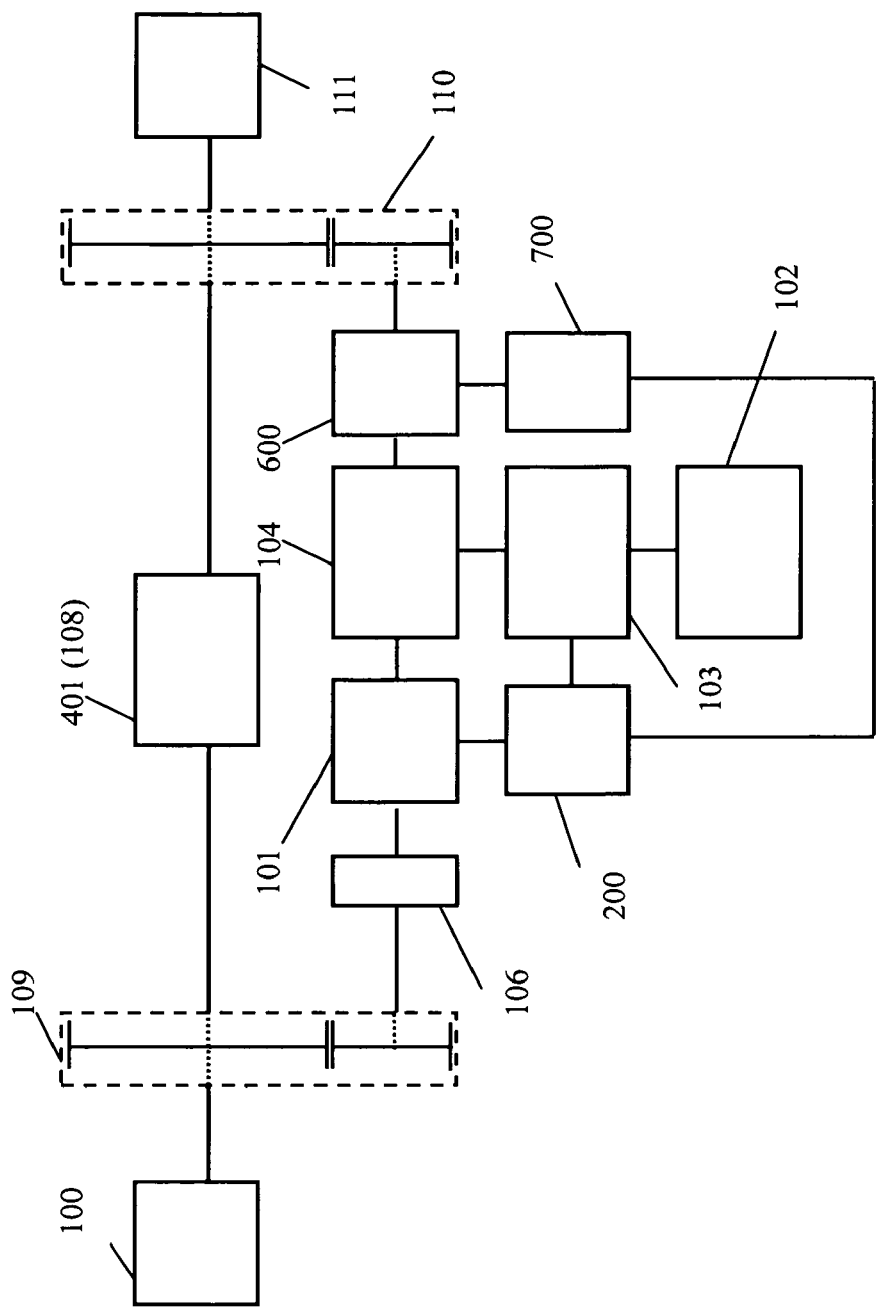
FIG. 5 is a fifth system block chart of the structure of the present invention.

The reverse specific motor as illustrated in FIG. 1 additionally provided in the power reverse system for the engine driven motorcycle is replaced with a specific electro-mechanical unit 600 giving functions as a motor and a generator as illustrated in FIG. 5 for a fifth system block chart of the structure of the power reverse system for the engine driven motorcycle of the present invention; wherein, an additional motor operation and regeneration control circuit 700 as controlled by the manual control interface 102 and the central controller 103 is provided to control the motor and generator specific electro-mechanical unit 600 to execute braking that permits regeneration. The motor and generator specific electro-mechanical unit 600 is directly coupled to or coupled via a driver to the load 111. When the manual control interface 102 drives the motor unit 101 to rotate in positive direction through the drive control device 104 as controlled by the central controller 103, the engine 100 is started through the one-way driver 106 (or a conventional clutch mechanism that automatically drops back once the engine is started) and the primary transmission ratio device 109; or the motor and generator specific electro-mechanical unit 600 as controlled by the manual control interface through the motor operation and regeneration control circuit 700 as controlled by the central controller to execute the power reverse by the function of inverse rotation of the motor, thus to drive the engine driven motorcycle, i.e., the load 111 to execute reverse drive. Furthermore, when the engine driven motorcycle in its forwarding drive executes a brake to decelerate, the motor and generator specific electro-mechanical unit 600 unit is inversely drawn by the load 111 to generate, and the power so generated in turn charges the batteries 200 through the motor operation and regeneration control circuit 700 to provide regeneration by braking. In addition to charging the batteries, the power generated by the motor and generator specific electro-mechanical unit is also supplied to other electrical load to provide the function of braking by the power regenerated. The turning axle 202 of the primary transmission ratio device 109 and the turning axle 203 of the secondary transmission ratio device 110 are respectively coupled to the input and output structures at both ends of the eccentric clutch 108 (or the manually controllable clutch 401), so to transmit or interrupt the power between the engine 100 and the load 111 as controlled.

Figure 6:
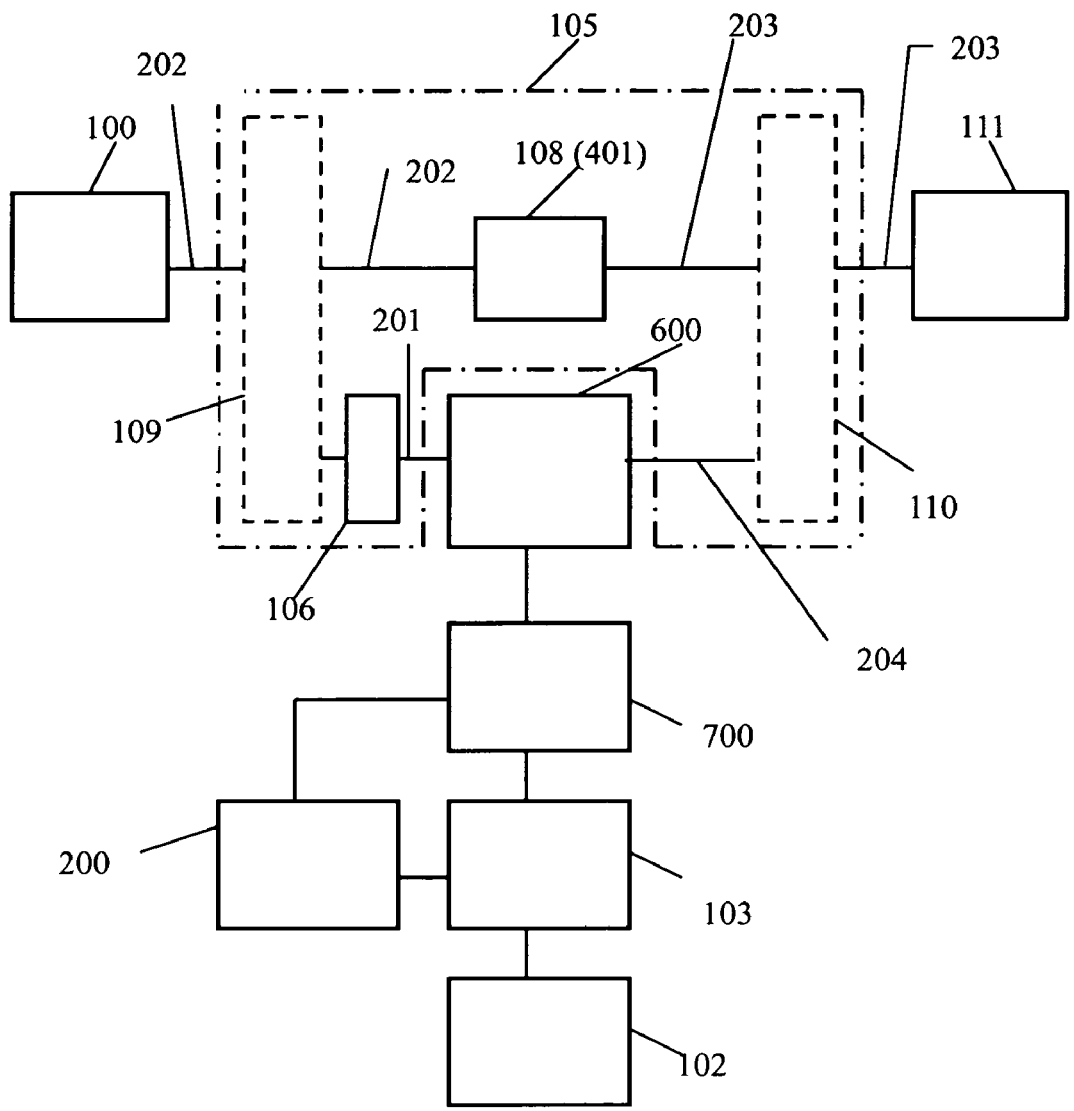
FIG. 6 is a sixth system block chart of the structure of the present invention.

As shown in FIG. 6 for a sixth system block chart of the structure of the power reverse system for the engine driven motorcycle of the present invention, wherein, the power reverse system has the motor and generator specific electro-mechanical unit 600 to replace the motor as illustrated in FIG. 1. the additional motor operation and regeneration control circuit 700 as controlled by the manual control interface 102 and the central controller 103 is provided to control the motor and generator specific electro-mechanical unit 600 to execute starting the engine, power reverse for the engine driven motorcycle, and the brake that permits regeneration. The motor and generator specific electro-mechanical unit 600 is directly coupled to or coupled via a driver to the load 111. When the manual control interface 102 controls the motor operation and regeneration control circuit 700 via the central controller 103 thus to drive the motor and generator specific electro-mechanical unit 600 to execute the operation of a motor rotating in positive direction, and the engine 100 is started through the one-way driver 106 (or a conventional clutch mechanism that automatically drops back once the engine is started) and the primary transmission ratio device 109; or the motor and generator specific electro-mechanical unit 600 executes the power reverse by the function of inverse rotation of the motor, thus to drive the engine driven motorcycle, i.e., the load 111 to execute reverse drive. Furthermore, when the engine driven motorcycle in its forwarding drive executes a brake to decelerate, the motor and generator specific electro-mechanical unit 600 unit is inversely drawn by the load 111 to generate, and the power so generated in turn charges the batteries 200 through the motor operation and regeneration control circuit 700 to provide regeneration by braking. In addition to charging the batteries, the power generated by the motor and generator specific electro-mechanical unit is also supplied to other electrical load to provide the function of braking by the power regenerated. The turning axle 202 of the primary transmission ratio device 109 and the turning axle 203 of the secondary transmission ratio device 110 are respectively coupled to the input and output structures at both ends of the eccentric clutch 108 (or the manually controllable clutch 401), so to transmit or interrupt the power between the engine 100 and the load 111 as controlled.

To avoid operation interference, in the specific driveline, a mechanism, or a electro-mechanical or electronic circuit is used to interlock the manual control interface of the manually controllable clutch, and the driver control device to drive the motorcycle to execute the reverse by the control and operation of the motor unit or the specific motor, or the reverse specific motor unit functioning as a motor and a generator; so to avoid mutual interference between the engine driving the motorcycle to forward and the motor rotating in negative direction for a reverse drive.

The one-way driver 106 (or the conventional clutch mechanism that automatically draws back once the engine is started) that transmit the power from the motor to the engine 100 automatically draws back once the engine is started and accelerating used in each and all those preferred embodiments given above, and the primary transmission ratio device 109 may be each provided as standalone device, or sharing a common structure for the transmission ratio to start the engine by the motor and to automatically draw back once the engine is started.

The power reverse for an engine driven motorcycle of the present invention is innovative and practical by providing a specific driveline at where between the engine and the motor to start the engine when the motor is rotating in positive direction, or to drive the motorcycle to execute power reverse when the motor is rotating in negative direction, or to provide an independent reverse drive motor to facilitate the rider to back his motorcycle from the pack of motorcycles parked on roadside; and further providing a motor and generator specific electro-mechanical unit 600 to replace the motor unit 101 to execute the power reverse and to function as a generator for applying the brake by the power regenerated. Therefore, this application is duly filed accordingly.

The invention claimed is:

1. A power reverse system, for use with a motorcycle having an engine and a load that includes wheels, to execute power reverse operation, comprising:

a motor unit that is rotatable in a positive or negative direction; and specific driveline means, coupled to the motor unit, engine, and load, for starting the engine when the motor unit is rotating in the positive direction, and for executing reverse drive operation of the motorcycle by rotating the wheels of the load in a reverse direction when the motor is rotating in the negative direction, wherein the specific driveline means comprises a primary transmission ratio device (109) coupled to the engine (100), a secondary transmission ratio device (110) coupled to the load (111), a first one-way driver (106) coupled between the motor unit (101) and the primary transmission ratio device (109), a second one-way driver (107) coupled between the motor unit (101) and the secondary transmission ration device (110), and a clutch (108) coupled between the primary and secondary transmission ration devices, wherein, when the motor unit (101) is rotating in the positive direction, the motor unit starts the engine (100) via the first one-way driver (106) and the primary transmission ratio device (109), and wherein, when the motor unit (101) is rotating in the negative direction, the motor unit drives the load (111) via the second one-way driver (107) and the secondary transmission ratio device (110) so as to perform power reverse operation of the motorcycle.

2. The power reverse system of claim 1, wherein the engine (100) is an internal combustion engine, wherein the motor unit (101) comprises an AC or DC, brush or brushless rotary motor, wherein the primary transmission ration device (109) comprises gears (301, 302), wherein the secondary transmission ration device (110) also comprises gears (303, 304), and wherein the clutch is a centrifugal clutch (108) having a friction plate that operates reversely to engine speed, the clutch being engaged when the engine speed exceeds a predetermined value and being disengaged when the engine speed does not exceed the predetermined value.

3. The power reverse system of claim 2, wherein the first one-way driver (106) idles after the engine (100) starts if the rotation speed at a terminal of the first one-way driver (106) coupled to the engine exceeds the rotation speed at a terminal of the first one-way driver (106) coupled to the motor unit (101) to interrupt the transmission between the primary transmission ratio device (109) and the motor unit (101).

4. The power reverse system of claim 1, wherein the engine (100) is an internal combustion engine, wherein the motor unit (101) comprises an AC or DC, brush or brushless rotary motor, wherein the primary transmission ration device (109) comprises gears (301, 302), wherein the secondary transmission ration device (110) also comprises gears (303, 304), and wherein the clutch is a manually controlled or is driven by mechanical force, hydraulic force or electromagnetic force.

* * * * *